United States Patent [19]

Giles, Jr et al.

[11] Patent Number: 4,579,910

[45] Date of Patent: Apr. 1, 1986

[54] POLYCARBONATE COMPOSITION

[75] Inventors: Harold F. Giles, Jr, Cheshire; Robert P. Hirt, Jr., Lenox, both of Mass.

[73] Assignee: General Electric Company, Mt. Vernon, Ind.

[21] Appl. No.: 688,376

[22] Filed: Jan. 2, 1985

[51] Int. Cl.$^4$ .............................................. C08L 69/00
[52] U.S. Cl. .................................... 525/148; 525/146
[58] Field of Search .................... 525/67, 60, 57, 148, 525/146

[56] References Cited

U.S. PATENT DOCUMENTS

| | | | |
|---|---|---|---|
| 3,431,224 | 3/1969 | Goldblum | 525/453 |
| 3,585,177 | 6/1971 | Gardner et al. | 525/62 |
| 4,226,950 | 10/1980 | Holub et al. | 525/148 |
| 4,390,657 | 6/1983 | Liu | 525/148 |
| 4,496,693 | 1/1985 | Rosenquist et al. | 525/148 |

*Primary Examiner*—Veronica P. Hoke
*Attorney, Agent, or Firm*—Myron B. Kapustij; Martin B. Barancik

[57] ABSTRACT

Polycarbonate composition comprising, in physical admixture:

(i) from about 10 to about 96 weight percent of at least one high molecular weight thermoplastic aromatic polycarbonate resin;

(ii) from about 2 to about 35 weight percent of at least one olefin vinyl ester copolymer; and (iii) from about 2 to about 35 weight percent of at least one olefin vinyl alcohol copolymer or from about 2 to about 90 weight percent of at least one polyolefin.

19 Claims, No Drawings

POLYCARBONATE COMPOSITION

BACKGROUND OF THE INVENTION

Aromatic polycarbonates are well known polymers having excellent properties of impact resistance, toughness, heat resistance, and dimensional strength. However, these polycarbonates generally exhibit relatively poor resistance to solvents. Resistance to organic solvents, particularly those having a high aromatic content, is not exceptional and may be upgraded significantly. Of particular concern is the relatively poor resistance of aromatic polycarbonates to basic solvents such as those containing hydroxyl groups, basic alcohols, and amines. Basic substances are known to attack the carbonate bond thereby forming oligomers out of the polycarbonate resin with a concomitant decrease in such properties as impact strength.

The admixing of aromatic polycarbonates with other polymers is generally carried out in order to upgrade certain properties of polycarbonates. Because of their great strength to weight ratio, as well as upgrading of other properties, aromatic polycarbonate admixtures have extended the application of aromatic polycarbonates to many potential fields, particularly the automotive field. Various upgrading of certain properties must be done to provide a polycarbonate composition suitable for various specific applications. For example, a part made for use in or near engine compartments of an automotive vehicle should maintain good properties at high temperatures. Exposure to certain chemicals such as gasoline can be very significant for a bumper made of polycarbonate. Often, however, the improvement of one property by blending the polycarbonate with another plastic resin may not result in the improvement of another property, or may actually lower or adversely affect other properties. Futhermore, the blending of polycarbonate with certain other resins can bring about incompatibility problems as shown by surface delamination, poor weld line strength, excessive stress cracking or crazing, and the like.

It is an object of the instant invention to provide polycarbonate compositions exhibiting improved resistance to solvents while simultaneously exhibiting good compatability of the individual components of these compositions.

SUMMARY OF THE INVENTION

The instant invention is directed to multicomponent aromatic polycarbonate compositions exhibiting improved resistance to solvents and compatibility of the individual components comprised of, in physical admixture:

(i) at least one high molecular weight aromatic polycarbonate resin;

(ii) at least one olefin vinyl ester copolymer; and (iii) either a polyolefin resin or an olefin vinyl alcohol copolymer.

DESCRIPTION OF THE INVENTION

In accordance with the instant invention there is provided a novel multicomponent polycarbonate composition suitable for molding shaped articles exhibiting improved resistance to solvents and compatibility of the individual components comprised of, in physical admixture:

(i) at least one aromatic polycarbonate resin;

(ii) at least one olefin vinyl ester copolymer; and (iii) either an olefin vinyl alcohol copolymer or a polyolefin.

The instant composition contains from 10 to about 96 weight percent of at least one high molecular weight aromatic polycarbonate, preferably from about 15 to about 90 weight percent of at least one polycarbonate, and more preferably from about 20 to about 85 weight percent of at least one polycarbonate; from about 2 to about 35 weight percent of at least one olefin vinyl ester copolymer, preferably from about 3 to about 30 weight percent of said olefin vinyl ester copolymer, and more preferably from about 5 to about 25 weight percent of said olefin vinyl ester copolymer; and either from about 2 to about 90 weight percent polyolefin, preferably from about 5 to about 85 weight percent polyolefin, and more preferably from about 10 to about 80 weight percent polyolefin, or from about 2 to about 35 weight percent of at least one olefin vinyl alcohol copolymer, preferably from about 3 to about 30 weight percent of said olefin vinyl alcohol copolymer, and more preferably from about 5 to about 25 weight percent of said olefin vinyl alcohol copolymer. Weight percent is determined based on the total amounts of components (i)–(iii) present in the composition.

As regards component (iii) the composition may contain either from 1 to about 35 weight percent of the olefin vinyl alcohol and 0 weight % polyolefin, or from about 2 to about 90 weight percent of said polyolefin and 0 weight % of said olefin vinyl alcohol copolymer.

The aromatic high molecular weight polycarbonates which comprise the first component of the instant multi-component composition are known materials which may be readily prepared by a variety of known processes such as inetrfacial polymerization, transesterification, melt polymerization, and the like. A particularly useful process for the preparation of these polycarbonates is the interfacial polymerization process involving the reaction of a dihydric phenol with a carbonate precursor in the presence of a aqueous caustic solution, a water immiscible solvent, a polymerization catalyst, and a molecular weight regulator.

The aromatic polycarbonates, as well as methods for their preparation, are disclosed, inter alia, in U.S. Pat. Nos. 2,999,835, 3,028,365, 3,275,601, 3,334,154 and 3,989,672, all of which are hereby incorporated herein by reference.

Typical of some of the dihydric phenols which may be employed in the preparation of the instant polycarbonates are 2,2-bis(4-hydroxyphenyl)propane (bisphenol-A); 1,1-bis(4-hydroxyphenyl)propane; 2,2-bis(4-hydroxyphenyl)pentane; 2,2-bis(4-hydroxyphenyl) pentane; 2,2-bis(3,5-dimethyl-4-hydroxyphenyl)propane; 1,1-bis(4-hydroxyphenyl)cyclohexane; 2,2-bis(3,5-dibromo-4-hydroxyphenyl)propane; 1,3-bis(4-hydroxyphenyl)propane; 4,4'-thiodiphenol, p,p'-dihydroxydiphenyl; bis(3,5-diisopropyl-4-hydroxyphenyl)sulfone; and bis(4-hydroxyphenyl)ether. Other useful dihydric phenols are disclosed in U.S. Pat. Nos. 2,999,835, 3,028,365, 3,334,154, 3,035,021, 3,036,036, 3,036,037, 3,036,038 and 3,036,039, all of which are hereby incorporated herein by reference.

It is, of course, possible to employ a mixture of two or more different dihydric phenols or a copolymer of a dihydric phenol with a glycol or with hydroxy or acid terminated polyester, or with a dibasic acid in the event a carbonate copolymer or interpolymer rather than a homopolymer is desired for use in the preparation of the carbonate polymers of the instant invention. Also employed in the practice of this invention may be blends of any of the above materials to provide the aromatic carbonate polymer.

The carbonate precursor may be either a carbonyl halide, a carbonate ester, or a bishaloformate. The carbonyl halides which can be employed herein are carbonyl bromide, carbonyl chloride, and mixtures thereof. Typical carbonate esters which may be employed herein are diphenyl carbonate, di-(halophenyl)carbonates such as di(chlororphenyl)carbonate, di(bromophenyl)carbonate), di(trichlorophenyl)carbonate, etc., di(alkylphenyl)carbonates such as di(tolyl) carbonate, etc., di(naphthyl)carbonate,di(chloronaphthyl)carbonate, phenyl tolyl carbonate, chlorophenyl chloronaphthyl carbonate, etc., or mixtures thereof. The bishaloformates suitable for use herein include the bishaloformates of dihydric phenols such as bischloroformate of hydroquinone, bischloroformate of bisphenol-A, and the like; or bishaloformates of glycols such as the bischloroformate of ethylene glycol, polyethylene glycol, neopentyl glycol, and the like. While other carbonate precursors will occur to those skilled in the art, carbonyl chloride, also known as phosgene, is the preferred carbonate precursor.

As mentioned hereinafore the polycarbonates useful in the instant invention may be prepared via the interfacial polymerization process. The water immiscible solvents which may be utilized in this process include methylene chloride, and the like. The catalysts can be any of the suitable catalysts which initiate the polymerization reaction between the dihydric phenol and the carbonate precursor. These catalysts include, but are not limite to, tertiary amines such as triethylamine, tripropylamine, N,N-dimethylaniline, quaternary ammonium compounds, and quaternary phosphonium compounds. The molecular weight regulators can be any of the known compounds that control or regulate the molecular weight by a chain terminating mechanism. These compounds include, but are not limited to, phenol, tertiarybutyl phenol, chroman-I, and the like.

Particularly useful polycarbonates are those containing recurring structural units represented by the general formula

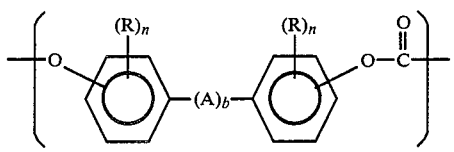

I.

wherein:
R is independently selected from halogen and monovalent hydrocarbon radicals;
A is selected from divalent hydrocarbon radicals,

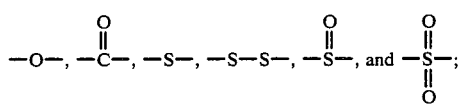

b is either zero or one; and
n is independently selected from integers having a value of from 0 to 4 inclusive.

The monovalent hydrocarbon radicals represented by R include alkyl, cycloalkyl, aryl, aralkyl and alkaryl radicals. The divalent hydrocarbon radicals represented by A include alkylene, cycloalkylene, alkylidene, and cycloalkylidene radicals.

Preferred alkyl radicals are those containing from 1 to about 10 carbon atoms. Some illustrative non-limiting examples of these alkyl radicals include methyl, ethyl, propyl, isopropyl, butyl, tertiarybutyl, pentyl, and neopentyl.

The preferred cycloalkyl radicals represented by R are those containing from 4 to about 8 ring carbon atoms, e.g., cyclobutyl, cyclopentyl, cyclohexyl, methylcyclohexyl.

Preferred aryl radicals represented by R are those containing from 6 to 12 ring carbon atoms, e.g., phenyl, naphthyl, and biphenyl.

Preferred aralkyl and alkaryl radicals represented by R are those containing from 7 to about 14 carbon atoms.

Preferred alkylene radicals represented by A are those containing from 2 to about 20 carbon atoms. Preferred alkylidene radicals represented by A are those containing from 1 to about 20 carbon atoms. Preferred cycloalkylene and cycloalkylidene radicals represented by A are those containing from 6 to about 16 ring carbon atoms.

Also included herein are the randomly branched thermoplastic aromatic polycarbonates which are obtained by the reaction of a dihydric phenol, a carbonate precursor, and a polyfunctional aromatic compound which acts as a branching agent. These polyfunctional aromatic compounds are well known in the art and contain at least three functional groups which may be hydroxyl, carboxyl, carboxylic anhydride, haloformyl, or mixtures thereof. Some illustrative non-limiting examples of these polyfunctional aromatic compounds include trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenone tetracarboxylic anhydride, and the like.

Also included herein are blends of linear and branched polycarbonates.

Within the instant definition of aromatic polycarbonates are also the copolyester-carbonates, that is a polymer derived from a dihydric phenol, a carbonate precursor, and an ester precursor such as a difunctional carboxylic acid or an ester forming reactive derivative thereof. These copolyestercarbonates contain ester bonds and carbonate bonds in the polymer chain. These copolyester-carbonates are disclosed, inter alia, in U.S. Pat. No. 3,169,121, which is hereby incorporated herein by reference.

The olefin vinyl ester copolymers which comprise the second component of the instant compositions are well known in the art and are generally commercially available. These olefins are prepared by the copolymerization of an olefin and a vinyl ester. The olefins used in the preparation of the olefin vinyl esters are the lower alpha olefins of from 2 to about 4 carbon atoms. An especially preferred olefin is ethylene.

The vinyl esters which can be copolymerized with the olefins are the vinyl ester monomers represented by the general formula

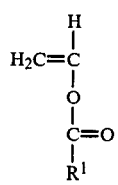

II.

wherein $R^1$ is selected from hydrogen, alkyl radicals of from 1 to about 10 carbon atoms, and aryl radicals of from 6 to 12 carbon atoms. Some illustrative non-limiting examples of these vinyl esters include vinyl formate, vinyl acetate, vinyl propionate, vinyl butyrate, and vinyl benzoate. A particularly useful vinyl ester is vinyl acetate.

The preferred olefin vinyl ester copolymer is ethylene vinyl acetate. Especially preferred ethylene vinyl acetate copolymers are those whose acetate content is from about 15 to about 35 weight percent based on the weight of the copolymer.

The third component of the instant multicomponent blends is either(i) a olefin vinyl alcohol copolymer, or (ii) a polyolefin. The olefin vinyl alcohols are well known in the art and are disclosed, inter alia, in U.S. Pat. No. 3,585,177, which is hereby incorporated herein by reference. These olfin vinyl alcohol copolymers may be prepared by hydrolyzing olefin vinyl esters. The olfins used in the preparation of the olefin vinyl alcohols are the lower alpha olfins of from 2 to about 4 carbon atoms, e.g., ethylene, propylene, butene-1 and isobutylene. Especially preferred is ethylene.

Suitable vinyl esters which can be copolymerized with the olefin monomers and subsequently hydrolyzed to form the olfin vinyl alcohol copolymers include those vinyl esters represented by Formula II.

The preferred olefin vinyl alcohol copolymers are ethylene vinyl alcohol copolymers wherein the ethylene content is from about 5 to about 40 weight weight percent based on the weight of the copolymer. Especially preferred are ethylene vinyl alcohol copolymers wherein the ethylene content is from about 8.9 to about 36.7 weight percent. Most especially preferred are ethylene vinyl alcohol copolymers wherein the ethylene content is from about 12 to about 29.8 weight percent.

The residual ester content of the copolymer should be less than 3% and preferably less than 2% by weight. Most preferably the ester content is less than 1% by weight. The preferred olefin vinyl alcohol copolymers contain less than 2% homopolymers, and preferably less than about 1% homopolymers.

The term olefin vinyl alcohol copolymers also includes those copolymers containing a synthetic or natural rubber component such as butadiene, isoprene, natural rubbers, acrylonitrile-butadiene-styrene terpolymers, ethylene-propylene copolymers and terpolymers, chlorinated rubbers, and the like.

The polyolefins which can comprise the third component of the instant multicomponent compositions are well known in the art and are generally commercially available. Typical of the polyolefins are polyethylene, polypropylene, polybutylene, polyisobutylene or any of the polyolefins derived from olefin monomers having from two to about 8 carbon atoms. Copolymers of the above may be employed and are included within the trem polyolefin. Examples of copolymers include copolymers of ethylene and propylene or ethylene and butene. The term copolymers includes the usual copolymers, that is, random, block, and random block copolymers. Various densities of polyolefins can be employed in this invention and include high density polyethylene, linear low density polyethylene and low density polyethylene. The preferred polyolefin is polpropylene.

The compositions of the instant invention may optionally contain organic or inorganic fillers. These fillers are preferably inert fillers. The fillers which may be used are preferably particulate fillers such as particulate glass, e.g., chooped glass fiber, glass spheres such as glass microbaloons or microspheres, glass rovings, and pulverulent glass, clay, talc, mica, inorganic natural fibers, synthetic organic fibers, alumina, garphite, silica, calcium carbonate, carbon black, and the like. Generally such fillers are added to reinforce the structural integrity of the composition, e.g., to inhibit sagging and/or improve tensile strength and stiffness of the composition and also to reduce shrinkage, minimize crazing, and lower material costs. Generally the amount of filler employed in the compositions is in the range of from about 2 to about 60 weight percent, preferably from about 5 to about 50 weight percent, and especially from about 8 to about 30 weight percent based on the combined weight of components (i)–(iii) and the filler.

The compositions of the instant invention may also optionally contain an impact modifier to improve the impact properties of the compositions. Generally, these impact modifiers are well known in the art and serve to upgrade the impact properties of polymers such as polycarbonates. Examples of these impact modifiers include, but are not limited to, the following general categories:

polyacrylates;
polyolefins;
rubbery dienic polymers; and
styrenic polymers.

The polyacrylates which may be employed as impact modifiers are rubbery homopolymers or copolymers. In general the polyalkyl acrylates described in Brinkman et al., U.S. Pat. No. 3,581,659, incorporated herein by reference, can be used, especially those containing units derived from alkyl acrylates, particularly n-butyl acrylate. Acrylate containing copolymers wherein the other monomer is, for example, derived from a methactylate are also readily employable, see for example Japanese Patent Application Announcement 1968-18611, incoprorated herein by reference. Preferably the acrylate resin will be in the form of a rubber-elastic graft copolymer having a glass transition temperature below about $-20°$ C., preferably below about $-40°$ C., Schlichting, U.S. Pat. No. 4,022,748, incorporated herein by reference. More preferably, the acrylate resin will comprise a multiple state polymer having a rubbery first stage (core) and a thermoplastic hard final stage (shell), see Farnham U.S. Pat. No. 4,096,202, incorporated herein by reference.

The most preferred acrylate resin is a multiphase composite interpolymer comprised of a $C_1$–$C_5$ acrylate and a $C_1$–$C_5$ methacrylate. These interpolymers consist of about 25 to 95 weight percent of a first elastomeric phase polymerized from a monomer system comprising about 75 to 99.8 weight percent of a $C_1$–$C_5$ alkyl acrylate, 0.1 to 5 weight percent of cross linking monomer, 0.1 to 5 weight percent of graftlinking monomer, and about 75 to 5 weight percent of a final rigid thermoplastic phase polymerized in the presence of said elastomeric phase.

The crosslinking monomer is a polyethylenically unsaturated monomer having a plurality of addition polymerizable reactive groups which all polymerize at substantially the same rate or reaction. Suitable crosslinking monomers include polyacrylic and polymethacrylic esters of polyols such as butylene diacrylate and dimethacrylate, trimethylol propane trimethacrylate, and the like; di an trivinyl benzene, vinyl acrylate and methacrylate, and the like. the preferred crosslinking monomer is butylene diacrylate.

The graftlinking monomer is a polyethylenically unsaturated monomer having a plurality of addition polymerizable reactive groups, at least one of which polymerizes at substantially different rates of polymerization from at least one other of said reactive groups. The function of the graftlinking monomer is to provide a residual level of unsaturation in the elastomeric phase, particularly in the latter stages of polymerization and, consequently, at or near the surface of the elastomer particles.

When the rigid thermoplastic phase is subsequently polymerized at the surface of the elastomer, the residual unsaturated addition polymerizable reactive group contributed by the graftlinking monomer participates in the subsequent reaction so that at least a portion of the rigid phase is chemically attached to the surface of the elastomer. Among the effective graftlinking monomers are alkyl group containing monomers of alkyl esters of ethylenically unsaturated acids such as allyl acrylate, allyl methacrylate, diallyl maleate, dially fumurate, and allyl acid itaconate. Somewhat less preferred are the dially esters of polycarboxylic acid which do not contain polymerizable unsaturation. The preferred graftlinking monomers are allyl methacrylate and diallyl maleate.

A most preferred interpolymer has only two stages, a first stage comprising about 60 to 95 weight percent of the interpolymer and being polymerized from a monomer system comprising 95 to 99.8 weight percnt butyl acrylate, 0.1 to 2.5 weight percent butylene diacrylate as crosslinking agent, 0.1 to 2.5 weight percent allyl methacrylate or dially maleate as a graftlinking agent, with a final stage polymerized from about 60 to 100 percent by weight methyl methacrylate. The multiphase composite interpolymer Acryloid KM-330 available from Rohm and Hass is preferred. This interpolymer is comprised of small quantities of crosslinking and graft monomers, about 80 weight percent n-butyl acrylate and about 20 weight percent methyl methacrylate.

The polyolefins which can be employed as impact modifiers, particularly when component (iii) contains 0% polyolefin. are homopolymers and copolymers. Examples of homopolymers include polyethylene, polypropylene, polybutene-1, polyhexene, and the like. The polymers include the standard high density polymers, low density polymers as well as the new linear low density polyolefins such as the linear low density polyethylene made with butene-1 or octene-1. Other examples of copolymers containing at east one olefin monomer can be employed. For example, copolymers of ethylene and propylene can be employed as well as a copolymer of an olefin and an acrylate such as ethylene ethyl acrylate, a copolymer available from Union Carbide as DPD-6169. Other higher olefin monomers can be employed as copolymers with alkyl acrylates, for example propylene an n-butyl acrylate and the like. These polyolefin polymers can also be reacted with rubbery dienes so as to form terpolymers of the EPDM family such as ethylene propylene diene terpolymers, for example EPSYN 704 available from Copolymer Rubber.

Various rubbery polymers can also be employed as impact modifiers. Examples of such rubbery polymers include polybutadiene, polyisoprene, styrene-butadiene and various other copolymers having a rubbery dienic comonomer.

Styrene containing polymers also can be employed as impact modifiers. Examples of such polymers include acrylonitrile-butadiene-styrene, styrene-acrylonitrile, acrylonitrile-butadiene-alpha-methylstyrene, methacrylate-butadiene-styrene and other high impact styrene containing polymers.

Other known impact modifiers include various elastomeric materials such as organic silicone rubbers, organic silicone polysiloxane polymers, polysiloxane-polycarbonate block copolymers, elastomeric fluorohydrocarbons, elastomeric polyesters, and the like.

Generally any minimum quantity of impact modifier which positively upgrades the impact strength of the instant compositions can be employed. Greater than this minimum quantity may be employed so long as the properties desired for a particular application of these compositions are substantially maintained. Generally a minimum of about two weight percent is sufficient to observe an increase in the impact strength. A minimum of about four weight percent is preferred. A level of about 30 weight percent should generally not be exceeded, preferably about 20 weight percent. Weight percent is measured as the amount of impact modifier in the total of impacet modifier plus components (i)–(iii) of the instant compositions.

The compositions of the instant invention may also optionally contain other commonly known and used additives such as antioxidants; mold release agents; ultraviolet radiation stabilizers such as benzophenones, benzotriazoles, cyanoacrylates, and the like; hydrolytic stabilizers such as the epoxides disclosed in U.S. Pat. Nos. 3,489,716, 4,138,379 and 3,839,247, all of which are incorporated herein by reference; color stabilizers such as the organophosphites disclosed in U.S. Pat. Nos. 3,305,520 and 4,118,370, both of which are hereby incorporated herein by reference; and flame retardants.

Some particularly useful flame retardants are the alkali and alkaline earth metal salts of organic sulfonic acids. These types of flame retardants are disclosed, inter alia, in U.S. Pat. Nos. 3,933,734, 3,948,851, 3,926,908, 3,919,167, 3,909,490, 3,953,396, 3,931,100, 3,978,024, 3,953,399, 3,917,559, 3,951,910 and 3,940,366, all of which are incorporated herein by reference. When the instant compositions contain flame retardants the amount of flame retardants present is an amount effective to improve the flame retardant properties of the compositions, i.e., a flame retaradant amount. Generally this amount is in the range of from about 0.01 to about 10 weight percent, based on the amount of flame retardant compound and components (i)–(iii) present in the compositions.

PREFERRED EMBODIMENT OF THE INVENTION

The following examples are presented to more fully and clearly illustrate the invention. The examples are intended to be and should be considered as illustrative rather than limiting the invention. In the examples, unless otherwise indicated, all parts and percentages are on a weight basis.

The following examples illustrate the blends of the instant invention.

EXAMPLE 1

A mixture comprised of 45 parts by weight of a polycarbonate derived from bisphenol-A and phosgene, 35 parts by weight of polypropylene, and 20 parts by weight of ethylene vinyl acetate (CXA E-136 from Dupont) is prepared by tumble blending the ingredients together on a tumble blender for 5 minutes. This mixture is then dried at 100° C. for about 4 hours. The mixture is then extruded on a 1.5 inch single screw extruder at 450°/460°/470°/480° F. (extruder profile from feed throat to die—with the die set at 475° F.). The extrudate is chopped into pellets and the pellets are injection molded on a 3 ounce Newburg at 460°/470°/480° F. into standard test bars.

These test bars are subjected to a variety of tests to determine their mechanical properties. These tests include ASTM D648, Heat distortion Temperature Under Load (DTUL); Flexural Strength and Flexural Modulus, ASTM D790; Notched Izod Impact Strength (NI), ASTM D256; and Gardner Impact Strength. The results of these tests are set forth in Table I.

EXAMPLE 2

The procedure of Example 1 is substantially repeated except that the mixture contains 10 parts by weight of polycarbonate, 85 parts of weight of polypropylene, and 5 parts by weight of CXA E-136.

EXAMPLE 3

The procedure of Example 1 is substantially repeated except that the mixture contains 10 parts by weight of polycarbonate resin, 70 parts by weight of polypropylene resin, and 20 parts by weight of CXA E-136.

Additionally, the Tensile properties, such as % elongation and Yield Strength of the test bars were determined. The test bars of Example 1-3 had a % elongation of 25%, 35% and 70%, respectively. These test bars had a Yield Strength (psi×10$^3$) of 4.09, 4.04 and 1.88, respectively.

TABLE I

| Example No. | Notched Izod (0.125") ft. lb./in. | Gardner Impact in. lbs. | DTUL °C. at 264 psi | Flexural Properties modulus (psi × 10$^5$) | strength (psi × 10$^3$) |
| --- | --- | --- | --- | --- | --- |
| 1 | 0.9 | 65 | 63 | 1.57 | 3.73 |
| 2 | 0.4 | 19 | 55 | 1.69 | 3.55 |
| 3 | 0.4 | 108 | 45 | 1.38 | 3.12 |

Obviously, other modifications and variations of the present invention are possible. It is, therefore, to be understood that changes may be made in the particular embodiments of the invention as described herein which are within the full intended scope of the invention as defined by the appended claims.

What is claimed is:

1. Polycarbonate composition consisting essentially of, in physical admixture:
   (i) from about 10 to about 96 weight percent of at least one aromatic polycarbonate resin;
   (ii) from about 2 to about 35 weight percent of at least one olefin vinyl ester copolymer comprised of the polymerized reaction products of (a) at least one lower alpha olefin containing from 2 about 4 carbon atoms and (b) at least one vinyl ester monomer represented by the formula

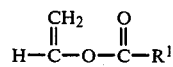

wherein R$^1$ is selected from hydrogen, alkyl radicals, or aryl radicals; and
   (iii) from about 2 to about 90 weight percent of at least one polyolefin derived from at least one olefin monomer containing from 2 to about 8 carbon atoms.

2. The composition of claim 1 wherein said polyolefin is polypropylene.

3. The composition of claim 1 wherein said polycarbonate is bisphenol-A polycarbonate.

4. The composition of claim 1 wherein said olefin vinyl ester copolymer (ii) is ethylene vinyl acetate.

5. The composition of claim 4 wherein said polycarbonate is bisphenol-A polycarbonate.

6. The composition of claim 5 wherein said polyolefin (iii) is polypropylene.

7. The composition of claim 1 which contains an impact modifying amount of at least one impact modifier.

8. The composition of claim 1 which contains a flame retardant amount of at least one flame retardant compound.

9. The composition of claim 8 wherein said flame retardant compound is selected from the alkali and alkaline earth metal salts of organic sulfonic acids.

10. The composition of claim 1 which contains a filler.

11. The composition of claim 1 which contains from about 15 to about 90 weight percent of (i).

12. The composition of claim 11 which contains from about 20 to about 85 weight percent of (i).

13. The composition of claim 1 which contains from about 3 to about 30 weight percent of (ii).

14. The composition of claim 13 which contains from about 5 to about 25 weight percent of (ii).

15. The composition of claim 1 which contains from about 5 to about 85 weight percent of (iii).

16. The composition of claim 14 which contains from about 10 to about 80 weight percent of (iii).

17. The composition of claim 1 wherein said alkyl radical represented by R$^1$ contains from 1 to about 10 carbon atoms.

18. The composition of claim 1 wherein said aryl radical represented by R$^1$ contains from 6 to 12 carbon atoms.

19. The composition of claim 1 wherein the ester content of (ii) is from about 15 to about 35 weight percent.